J. C. McNAUGHT.
AUTOMATIC TRUCK LOCK.
APPLICATION FILED OCT. 4, 1910.
985,363.
Patented Feb. 28, 1911.
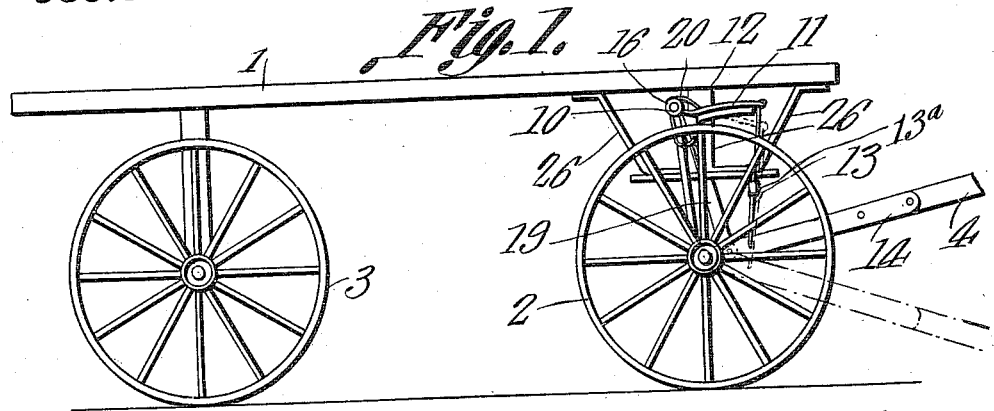
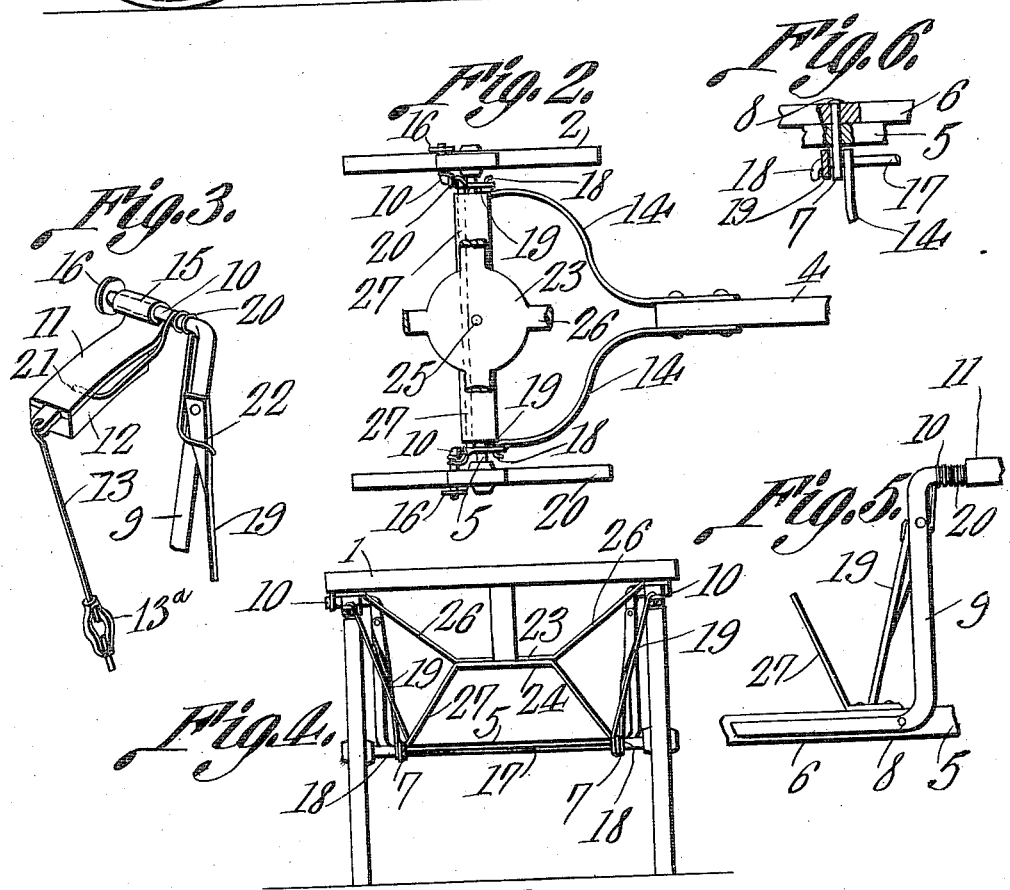
J. Charles McNaught, Inventor
Witnesses:
by ———— Attorneys

UNITED STATES PATENT OFFICE.

JACOB CHARLES McNAUGHT, OF KINGFISHER, OKLAHOMA.

AUTOMATIC TRUCK-LOCK.

985,363.  Specification of Letters Patent.  Patented Feb. 28, 1911.

Application filed October 4, 1910.  Serial No. 585,280.

*To all whom it may concern:*

Be it known that I, JACOB CHARLES MC-NAUGHT, a citizen of the United States, residing at Kingfisher, in the county of Kingfisher and State of Oklahoma, have invented a new and useful Automatic Truck-Lock, of which the following is a specification.

This invention relates to an automatic truck lock.

The object of the invention is to provide a lock to be used on four-wheeled platform trucks such as are employed at railway depots, in which by a novel arrangement of mechanism, the front wheels will be automatically locked against rotation when the tongue is dropped, and similarly released when the tongue is raised to pulling height, whereby when the tongue is dropped, to hold the truck so wind will not run it off from the platform, and to insure its remaining at the point where it is left.

With the above and other objects in view, as will appear as the nature of the invention is better understood, the same consists in the novel construction and combination of parts of an automatic truck lock, as will hereinafter be fully described and claimed.

In the accompanying drawings forming a part of this specification, and in which like characters of reference indicate corresponding parts: Figure 1 is a view in side elevation of a truck equipped with the improvements of the present invention. Fig. 2 is a top plan view of the front portion of the truck with the platform removed. Fig. 3 is a detail perspective view of the brake shoe and its support, showing the means by which it is held automatically out of engagement with the front wheel. Fig. 4 is a front elevation, partly in section. Fig. 5 is a detail view showing more particularly the manner in which the brake bar is secured to the front axle. Fig. 6 is a fragmentary detail view partly in section, showing the manner in which the tongue hounds are connected with the front axle and with the brake shoe bar. Fig. 7 is a fragmentary detail view of one of the members of the fifth wheel.

Referring to the drawings, 1 designates the platform of the truck, 2 the front wheels, 3 the rear wheels, and 4 the tongue, and as these parts may be of the usual or any preferred construction, further description is deemed unnecessary.

Disposed along the rear side of the front axle 5 is a brake bar 6 which is secured in position by a pair of eye bolts 7, the shanks of which project through the axle and bar and are held against disconnection in any preferred manner, in this instance by having their rear ends upset as shown at 8 in Fig. 6. The bar is bent to form two arms 9 that are disposed approximately at right angles to the axle, the terminal portion of each arm being bent outward to provide two pintles 10. Upon each of the pintles is pivotally mounted one end of a brake block 11 carrying a brake shoe 12, the other end of the block having connected with it one end of a rod 13, the other end of which connects with one of the tongue hounds 14, to the two of which is secured the tongue 4 which is of the usual or any preferred construction. The rod 13 is in two parts, and the opposing ends are connected by a turn buckle 13$^a$, by which to permit any desired adjustment of the brake shoe.

Each brake block is herein shown, as an example of one form that may be employed, as constructed of a plate of metal provided at one end with a tubular boss 15 which fits loosely on the pintle, and is held from disconnection therefrom by a nut or collar 16. The inner ends of the hounds are connected with the axle by a rod 17 which passes through the hounds and eye bolts and has its ends bent to provide stops 18 to retain it in place. Of course, if preferred, nuts or cotter pins could be employed in lieu of the stops, and as this will be obvious, illustration is deemed unnecessary.

It will be noted by reference to Fig. 1 that the points of connection between the rods 13 and the hounds are very close to the pivotal points of the latter, the object of this arrangement being to secure as strong a leverage as possible, thus to insure sufficient frictional contact between the brake shoes and the front wheels to secure positive locking of the latter. To stay the arms 9 against yielding when the brakes are applied, two braces 19 are employed, the upper ends of which are riveted to the arms 9 adjacent to the pintles and the lower ends of which engage with the rod 17.

In order to hold the brake shoes normally out of engagement with the front wheels, a spring 20 is employed in conjunction with each, the spring as shown in Fig. 3 being coiled about the pintle adjacent to its bend, and one end 21 being bent at right angles to its length and inserted between the brake block and the brake shoe, and the other end 22 being bent at right angles to its length and hooked around the arm 9 and brace 19. This is one form of spring that can be employed, but it is to be understood that the invention is not to be limited to the precise arrangement shown, as various other constructions could be employed for securing the same result and still be within the scope of the invention.

The means for connecting the front axle with the platform comprises a fifth wheel embodying an upper plate 23 and a lower plate 24. The plate 23 is connected with the platform by bracket arms 26, four being employed in the present instance, and the plate 24 is connected with the axle, to which it is riveted or bolted by arms 27, of which there are two, as shown in Fig. 7.

From the foregoing description it will be seen that when the tongue is raised to pulling height, the springs 20 will automatically lift the brake shoes from contact with the front wheels so that there will be no resistance presented in drawing the truck, and that when the tongue is dropped, the rods 13 will draw downward upon the outer ends of the brake shoe blocks and force the brake shoes into engagement with the front wheels and therefore effectively lock the truck against movement.

The improvements herein described are comparatively simple in character, but will be found to coöperate in the presentation of a thoroughly effective truck lock.

I claim:

1. The combination with the front axle of a truck, of a brake bar secured thereto and provided with out turned pintles, brake shoes journaled on the pintles, a tongue operatively connected with the brake shoes to apply the latter when in dropped position, and means for automatically releasing the shoes when the tongue is raised to hauling position.

2. The combination with the front axle of a truck, of a brake bar secured thereto and provided with out turned pintles, brake shoes journaled on the pintles, a tongue, a connection between the free ends of the brake shoes and the hounds of the tongue, and means to hold the brake shoes out of contact with the wheels when the tongue is in hauling position.

3. The combination with the front axle of a truck, of a brake bar secured thereto and provided with out turned pintles, brake blocks journaled on the pintles, brake shoes carried by the blocks, a tongue having hounds, connections between the brake block and the hounds adjacent to the axle, whereby to secure the maximum leverage, and springs carried by the pintles and operatively connected with the brake block whereby to hold the shoes out of contact with the wheels when the tongue is in hauling position.

In testimony that I claim the foregoing as my own, I have hereto affixed my signature in the presence of two witnesses.

J. CHARLES McNAUGHT.

Witnesses:
H. T. DAVIS,
W. B. LINDSEY.

---

Copies of this patent may be obtained for five cents each, by addressing the "Commissioner of Patents, Washington, D. C."